United States Patent
Steinwandel et al.

(10) Patent No.: US 10,371,066 B2
(45) Date of Patent: Aug. 6, 2019

(54) UNMANNED AIRCRAFT AND OPERATION METHOD FOR THE SAME

(71) Applicant: Airbus Defence and Space GmbH, Ottobrunn (DE)

(72) Inventors: Juergen Steinwandel, Uhldingen-Muehlhofen (DE); Florian Stagliano, Munich (DE); Jan Van Toor, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 15/953,209

(22) Filed: Apr. 13, 2018

(65) Prior Publication Data

US 2018/0283292 A1 Oct. 4, 2018

Related U.S. Application Data

(62) Division of application No. 14/439,502, filed as application No. PCT/DE2013/000620 on Oct. 31, 2012, now abandoned.

(30) Foreign Application Priority Data

Oct. 31, 2012 (DE) .......................... 10 2012 021 339

(51) Int. Cl.
| | |
|---|---|
| *F02D 29/02* | (2006.01) |
| *B64C 39/02* | (2006.01) |
| *B64D 27/02* | (2006.01) |
| *B64D 27/24* | (2006.01) |

(Continued)

(52) U.S. Cl.
CPC ............ *F02D 29/02* (2013.01); *B64C 39/024* (2013.01); *B64D 27/02* (2013.01); *B64D 27/24* (2013.01); *B64D 31/00* (2013.01); *B64D 41/00* (2013.01); *B64C 2201/024* (2013.01); *B64C 2201/042* (2013.01); *B64C 2201/044* (2013.01); *B64C 2201/066* (2013.01); *B64C 2201/086* (2013.01); *B64C 2201/088* (2013.01); *B64C 2201/104* (2013.01); *B64C 2201/108* (2013.01); *B64C 2201/16* (2013.01); *B64D 2027/026* (2013.01); *Y02T 50/44* (2013.01); *Y02T 50/64* (2013.01)

(58) Field of Classification Search
CPC ......... F02D 29/02; B64D 31/00; B64D 41/00; B64D 27/02; B64C 39/024
See application file for complete search history.

(56) References Cited

U.S. PATENT DOCUMENTS

| | | | | |
|---|---|---|---|---|
| 4,483,147 A | * | 11/1984 | Evans | .................... F02B 37/164 244/57 |
| 4,680,933 A | * | 7/1987 | Bozung | ................. F02B 37/005 290/52 |

(Continued)

OTHER PUBLICATIONS

Lieh et al, "Design of Hybrid Propulsion Systems for Unmanned Aerial Vehicles" (Year: 2011).*
Kaman, "K-Max Unmanned Aircraft System" (Year: 2010).*

Primary Examiner — Assres H Woldemaryam
(74) Attorney, Agent, or Firm — Crowell & Moring LLP

(57) ABSTRACT

An unmanned aircraft includes a propulsion system having a diesel or kerosene internal combustion engine and a charger device for engine charging. The propulsion system can be a hybrid propulsion system or a parallel hybrid propulsion system.

8 Claims, 5 Drawing Sheets

(51) Int. Cl.
*B64D 31/00* (2006.01)
*B64D 41/00* (2006.01)

(56) References Cited

U.S. PATENT DOCUMENTS

| | | | | |
|---|---|---|---|---|
| 5,183,014 | A * | 2/1993 | Stevenson | F01B 1/12 123/188.5 |
| 5,850,738 | A * | 12/1998 | Hayashi | F02B 37/18 60/602 |
| 6,112,523 | A * | 9/2000 | Kamo | F02B 37/013 60/600 |
| 6,721,646 | B2 * | 4/2004 | Carroll | B64C 39/024 123/676 |
| 6,883,503 | B2 * | 4/2005 | Carroll | F02B 33/40 123/559.1 |
| 7,775,043 | B2 * | 8/2010 | Funke | F02D 23/00 60/602 |
| 2006/0011778 | A1 * | 1/2006 | Small | B64C 39/00 244/12.2 |
| 2006/0016930 | A1 * | 1/2006 | Pak | A63H 27/14 244/12.4 |
| 2007/0204616 | A1 * | 9/2007 | Martin | F02B 37/127 60/602 |
| 2008/0184906 | A1 * | 8/2008 | Kejha | B64C 39/024 102/374 |
| 2009/0020958 | A1 * | 1/2009 | Soul | F02F 5/00 277/434 |
| 2010/0072318 | A1 * | 3/2010 | Westenberger | B64D 27/02 244/54 |
| 2010/0229809 | A1 * | 9/2010 | Braly | F02P 5/04 123/41.56 |
| 2011/0004364 | A1 * | 1/2011 | Sawada | B60K 6/445 701/22 |
| 2011/0108663 | A1 * | 5/2011 | Westenberger | B64D 27/02 244/60 |
| 2011/0197849 | A1 * | 8/2011 | Wright | F01C 1/22 123/241 |
| 2011/0277730 | A1 * | 11/2011 | Gregoire | F02M 55/04 123/447 |
| 2012/0117962 | A1 * | 5/2012 | VanDyne | F01N 3/103 60/600 |
| 2012/0209456 | A1 * | 8/2012 | Harmon | B64C 39/024 701/3 |
| 2012/0329593 | A1 * | 12/2012 | Larrabee | B64C 39/024 475/5 |
| 2013/0112158 | A1 * | 5/2013 | Weinzierl | F02B 75/22 123/41.01 |

* cited by examiner

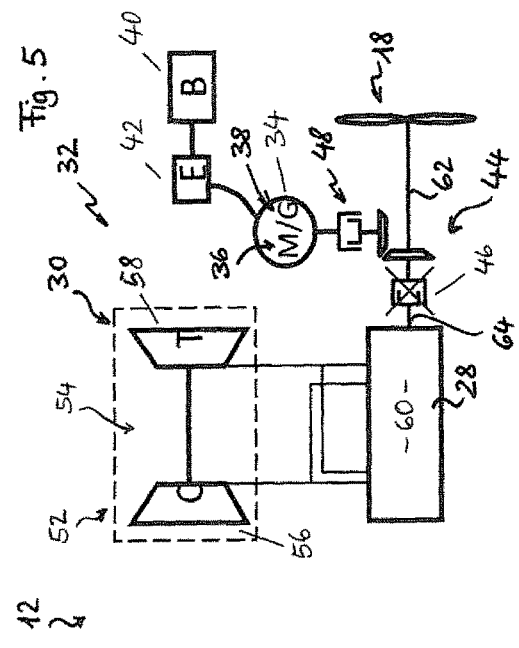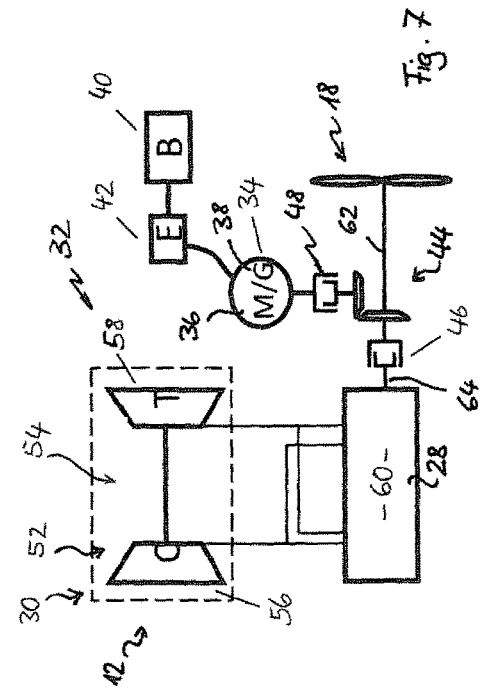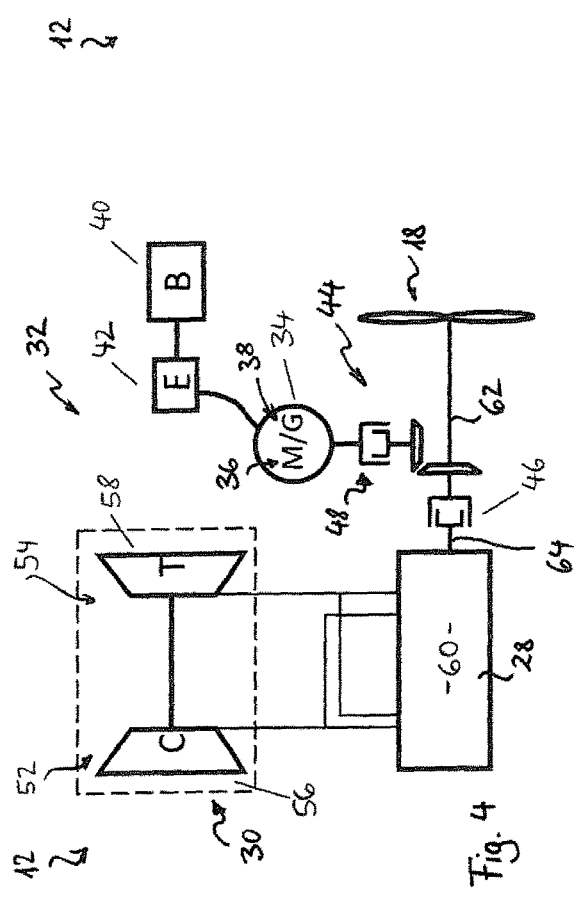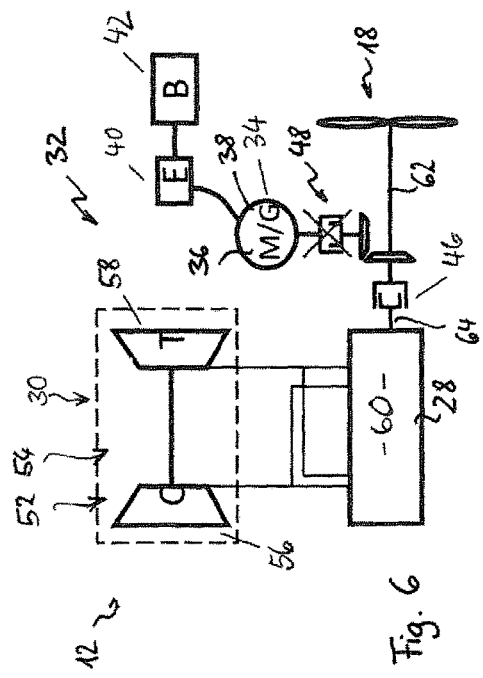

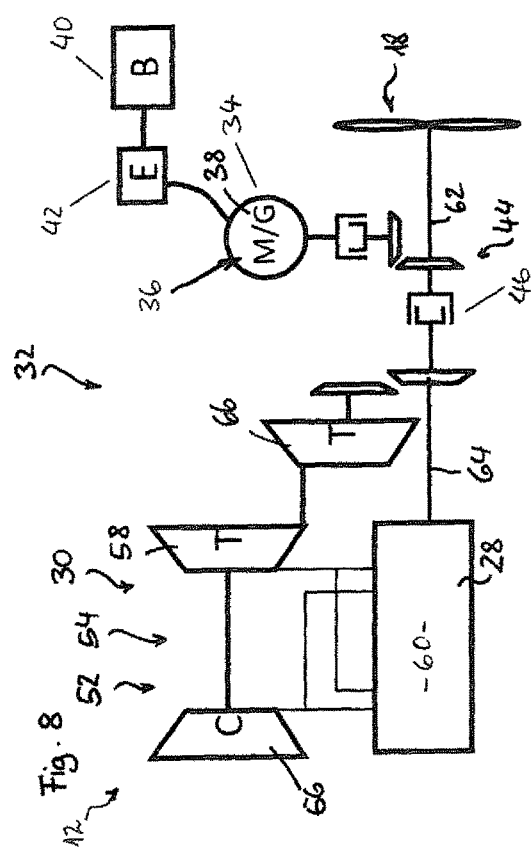
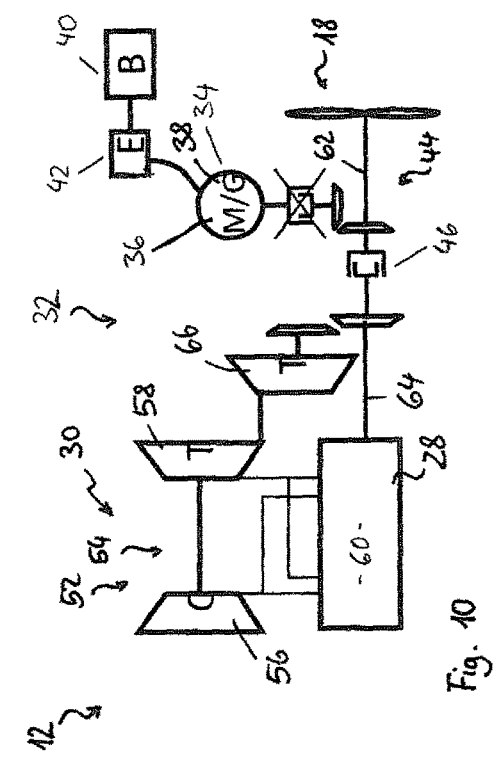
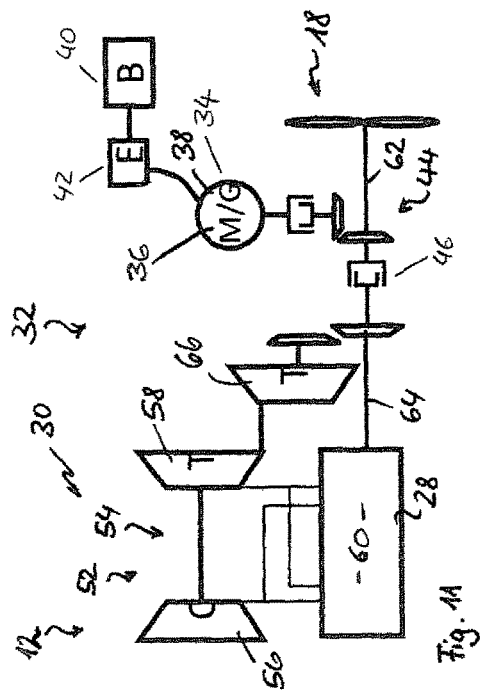
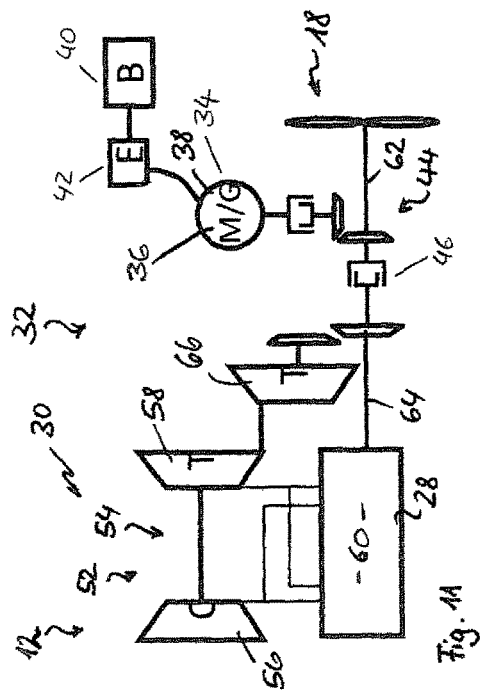

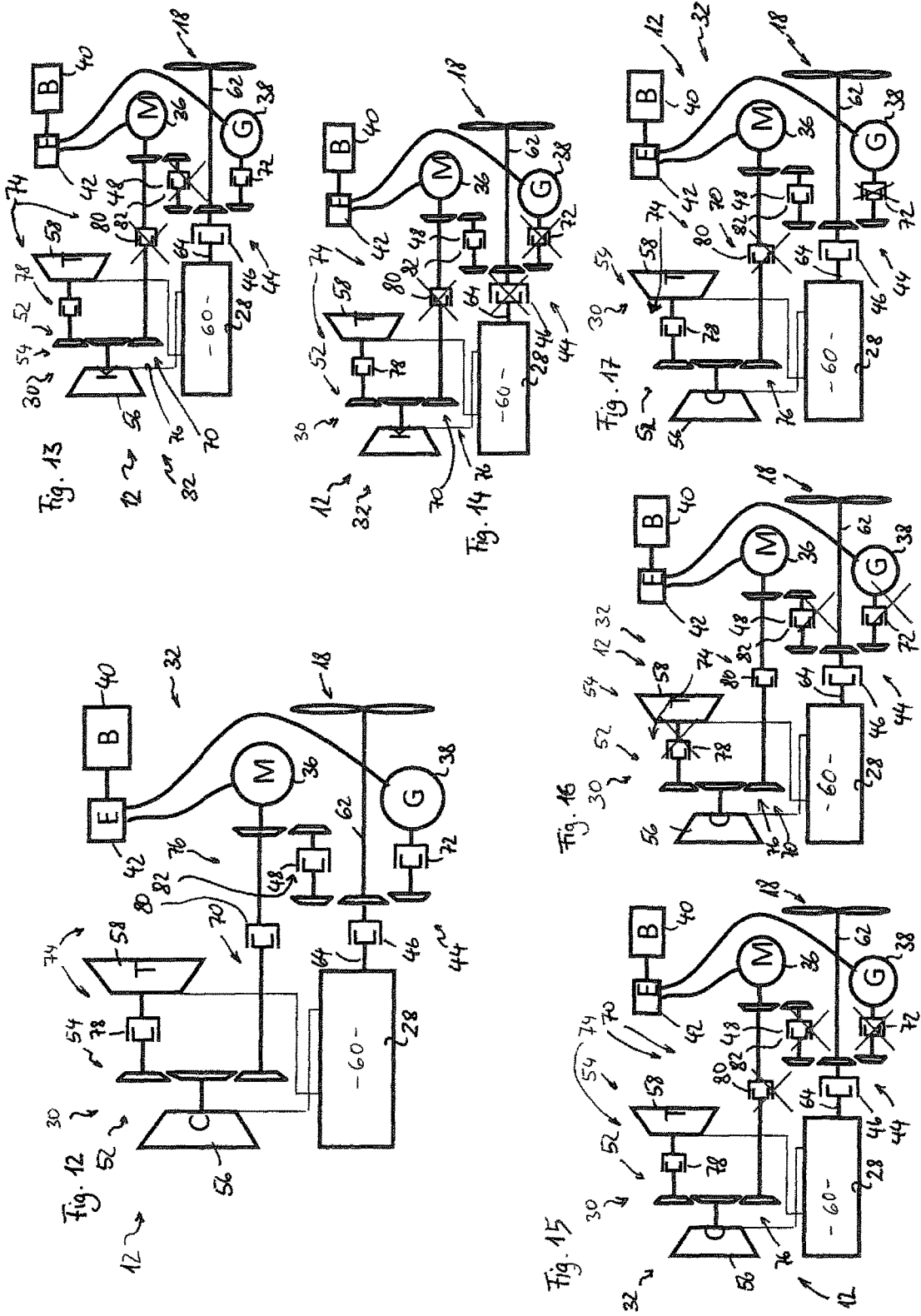

UNMANNED AIRCRAFT AND OPERATION METHOD FOR THE SAME

BACKGROUND AND SUMMARY OF THE INVENTION

Exemplary embodiment of the invention relate to an unmanned aircraft, as well as to an operating method therefor.

An unmanned aircraft, also known as a drone or an unmanned aerial vehicle (UAV), is a flying apparatus for unmanned aviation that can be used, for example, for surveillance, exploration, or reconnaissance, as a target drone, for measurement purposes, or even equipped with weapons, especially in combat zones. Drones can be used, for example, for military, secret services, or civilian purposes. A flying drone is unmanned, either automated via a computer program or controlled from the ground via radio signals or via satellite broadcasting. Depending on the application and equipment, drones can bear payloads, such as rockets for a military attack.

In the commonly used terminology, such aircraft are customarily referred to by the abbreviation UAV, which stands for an "unmanned aerial vehicle". Another abbreviation, UAS, which stands for "unmanned aircraft system", has also gained currency. The designation encompasses the entire system, constituted of the flying drone, the ground station for takeoff and (where appropriate) landing, and the station for guidance and supervision of the flight.

A comprehensive representation of UASs and different UAVs can be found in Reg Austin's "Unmanned Aircraft Systems—UAVS design, development and deployment", published by Wiley in 2010. The present disclosure builds upon the knowledge gained in that publication, and the document is hereby incorporated by reference.

German patent document DE 10 2010 021 022 A1 discloses a UAV in the form of a tiltwing aircraft.

UAVs with hybrid systems are known from patent documents U.S. Pat. No. 8,128,019 B2 and EP 2 196 392 A2. These two documents relate to mini-UAVs, which can be brought by foot soldiers into the field and can fly with very low power at low altitude. In such a case, an internal combustion engine is operated at a constant speed; an additional electric motor is variably operated in order to adjust the power in a simple and lightweight configuration.

Larger UAVs having a maximum takeoff weight from about 70 kg to about 1,000 kg are currently operated solely with reciprocating engines, with which petrol engines are generally used. Even larger UAVs generally have gas turbine jet engines in order to be able to generate the requisite power output.

The invention is aimed in particular at such larger UAVs having a maximum takeoff weight from about 70 kg, and exemplary embodiments are directed to an unmanned flying apparatus having a low-cost propulsion that also be used in a very versatile manner for different flight functions.

Exemplary embodiments of the invention are directed to an unmanned aircraft having a propulsion that comprises an internal combustion engine, configured as a diesel and/or kerosene engine, having a charger device for engine charging.

Preferably, the propulsion is a hybrid propulsion which, in addition to the internal combustion engine, comprises an electric motor and an energy storage device for storing electric energy for driving the electric motor.

Preferably the hybrid propulsion comprises a switchable coupling device with which the internal combustion engine and/or the electric motor can be selectively connected to a thrust generator.

Preferably, the internal combustion engine and the electric motor can be selectively operated in parallel or in series.

Preferably, the charging device is designed for multi-stage charging and/or comprises at least a first charger and a second charger, in particular for multi-stage charging.

Preferably, the charging device comprises at least one charger that can be driven by exhaust gas energy.

Preferably, the charging device comprises at least one mechanical charger.

Preferably, the at least one mechanical charger can be driven by an output shaft of the internal combustion engine and/or through an electric motor.

Preferably, the mechanical charger can be driven by the electric motor of the hybrid propulsion.

Preferably, a controller is provided, with which the charger device and/or the hybrid propulsion can be controlled in accordance with various parameters in flight operation.

Preferably, the controller is designed in order to control the charger device and/or the hybrid propulsion, in particular the switching on and off of a first and/or second stage of the engine charging or the switching on and off of the electric motor, in accordance with at least one of the parameters of altitude, angle of a takeoff and/or landing flight to the vertical, desired velocity, allowable heat output, allowable operating noise level, and/or temperature.

Preferably, the internal combustion engine is a rotary piston engine.

Preferably, the aircraft has a maximum takeoff weight of more than 70 kg, and in particular of more than 250 kg.

According to another aspect, the invention provides a method for operating such an unmanned aircraft, the method involving controlling charging of an internal combustion engine of a propulsion of the and/or a cooperation between an internal combustion engine and electric motor of a hybrid propulsion in accordance with at least one of the parameters of altitude, angle of a takeoff and/or landing flight to the vertical, desired velocity, allowable heat output, allowable operating noise level, and/or temperature.

Preferably, upon violation of a predetermined limit value for the at least one parameter, then:
  a first charging stage,
  a second charging stage,
  a mechanical charger,
  an electric charger,
  a first turbocharger,
  a second turbocharger, or
  an electric motor in addition to the running internal combustion engine and/or
  the internal combustion engine in addition to the running electric motor
  is switched on or switched off.

UAVs are used for various applications in various configurations, for both military and civilian purposes. With regard to energy efficiency, it would be advantageous to have purely electric propulsion. Purely electric propulsion would also be advantageous especially in military operations in terms of the thermal or acoustic signature. In other words, an electric propulsion has an advantage for UAVs in military use in that an especially quiet flight operation and/or a flight operation with low thermal emission is possible, such that the risk of the UAV being detected is reduced.

Currently, however, purely electric propulsion is only suitable for low power and low flight times. For example, a purely electric propulsion could be feasible for tactical UAVs with a maximum takeoff weight of up to about 70 kg in flight times between 20 minutes and at most three hours. Typical propulsion power would then be between 2 and 20 kW. There is then, however, a problem in the storage density of contemporary batteries.

To be able to take advantage of an electric propulsion also for larger UAVs, and also for higher flight altitudes and longer distances—especially for UAVs of the medium-altitude long-endurance (MALE) class, or the high-altitude long-endurance (HALE) class, the invention provides for the use of internal combustion engines, which are diesel- or kerosene-drive and have a charging system.

Especially preferably, these internal combustion engines are a part of a hybrid propulsion; in particular, a diesel-electric hybrid propulsion is provided.

Diesel and kerosene engines can be used universally, e.g., as propulsion for maritime UAVs. The corresponding engines have a lower fuel consumption than petrol engines or gas turbines, and also have a better partial load response.

For the purpose of optimizing energy and system technology, charging through a charger device is provided according to the invention.

If the exhaust gas energy of the internal combustion engines is used here for charging, such as with the exhaust gas energy of diesel engines, then the thermal signature can thereby be considerably reduced.

Preferably, such a charged diesel or kerosene internal combustion engine is combined with electrical components in a power train for UAVs. This offers, in particular, the following advantages:

For example, purely electric operation is possible in the emission region. The landing approach can be carried out using the internal combustion engine, where a purely or mostly electric operation takes place in the emission region in order to reduce the thermal and acoustic signature and thus increase the safety of the aircraft.

It is possible to have a boost operation by connecting an electric motor into the mechanical drive train. Such a boost operation can be used, for example, for the takeoff and/or landing phase in critical environmental conditions, for escaping, or for other situations where unusually high power is needed.

Such a propulsion can be used for all conceivable configurations of the UAV. The UAV can have, for example, a helicopter configuration, an A/C configuration, a tiltwing configuration, and/or a tiltrotor configuration.

In particular, according to one embodiment of the invention, UAVs can be propelled with propeller propulsion and/or impeller propulsion or with rotors of the performance class 30 kW to 400 kW per individual internal combustion engine. At requisite higher power, it would be possible to use, for example, a plurality of internal combustion engines. It would be particularly advantageous to take diesel/kerosene/rotary piston engines into consideration.

Such a rotary piston engine is very compact and, even when used with diesel or kerosene, is relatively lightweight. In addition, a rotary piston engine can easily be used at a plurality of power stages. For a lower power stage, it would be possible to use, for example, a single-rotor rotary piston engine, while at high power levels, another rotor would come into use, and so forth.

A particularly preferred embodiment relates to the combination of one such internal combustion engine with one electrical motor and one electric energy storage device into a hybrid propulsion, which is preferably provided as a parallel hybrid, meaning the provision of various charging concepts for the internal combustion engine.

Preferably, a UAV is provided with "heavy fuel" fuel operation and with charging. "Heavy fuel" refers in the USA in particular to diesel and/or kerosene propulsion.

Charged diesel engines are, of course, well known in the automotive industry. One example of a well-known charged diesel engine is the three-cylinder turbodiesel "Smart" car engine, which is also commercially available as an individual engine. In the present invention, a charged diesel engine or a charged kerosene engine is used for an unmanned aircraft. This is of particular interest for maritime applications of UAVs.

The charging of the internal combustion engine is especially advantageous. For example, charging is provided using the exhaust gas energy. In particular, chargers coupled to exhaust gas turbines ("turbochargers") are used here. In particular, use is made of the exhaust gas energy in two stages, through a series of connected exhaust gas turbines. Using the exhaust gas energy makes it possible to reduce the exhaust gas temperature. This lowers the signature for IR detection of the UAVs.

Further advantages of engines operating with diesel or kerosene are better efficiency and better partial load response as compared to petrol engines or gas turbines; in addition, such engines are more durable. Diesel engines output their rated power at a lower rotational speed.

More preferably, at least one first charger and one second charger are provided, in order to enable at least one two-stage charging.

The internal combustion engine can operate without charging for higher altitudes and lower power. For slightly higher power, a first stage of charging is switched on. For even higher power, the second stage can then be triggered. Of particular interest is two-stage charging with further usage of the exhaust gas energy. Such two-stage charging is interesting for higher altitudes above around 4,000 m and can be used even at altitudes of about 10,000 m to 12,000 m.

Another interesting concept is the mechanical charging. It is thus preferable for the internal combustion engine to comprise at least one mechanical charger as a charger. The advantage of mechanical charging is that the motor does not need to work against the exhaust gas pressure. Preferably, the mechanical charging can be decoupled. The mechanical charger can be drive, for example, via a drive shaft of the internal combustion engine and/or via an electric drive. The electric motor of the hybrid propulsion is particularly preferably used as the electric drive.

Thus, it is conceivable to have multi-stage charging with or without the use of exhaust gas energy, by the use of mechanical energy from the internal combustion engine or from the electric drive.

It is particularly preferable to provide a controller which controls the different manners of propulsion (electric motor and/or internal combustion engine) and/or the different charging systems depending on different parameters in flight operation of the UAV.

Possible parameters therefor are different altitudes. These can be detected, for example, via a pressure sensor. In such an embodiment of the invention, the UAV comprises a pressure sensor producing signals that are used to control the propulsion. Other examples of possible parameters are altitude and/or fast flight. Another parameter may be the power for takeoff and/or landing operations. With such a propulsion concept, both UAVs of the MALE class and UAVs of the HALE class can be operated with great functional versatility and a wide range of possible applications.

According to another aspect, the invention provides a UAV having a hybrid propulsion in which the UAV is operated as a mobile power supply unit after landing. The UAV preferably flies to the desired location and, once there, is readily available, in contrast to ground-based emergency generators. Through the increased application flexibility, the UAV can fly in particular to locations that are difficult or even impossible to reach by land and then ensure power there. The internal combustion engine, which drives the generator to provide the desired power, serves as the primary energy supply. In another embodiment, the electric energy storage device can be omitted so as to economize on weight. The UAV is as described above and below.

BRIEF DESCRIPTION OF THE DRAWING FIGURES

Embodiments of the invention shall be made more apparent below with reference to the accompanying drawings.

FIG. 4 illustrates a schematic representation of a first embodiment of propulsion for the unmanned aircraft according to FIGS. 1 to 3;

FIG. 5 illustrates a schematic representation of the first embodiment of the propulsion, in a first operating mode;

FIG. 6 illustrates a schematic representation of the first embodiment of the propulsion according to FIG. 4, in a second operating mode;

FIG. 7 illustrates a schematic representation of the first embodiment of the propulsion according to FIG. 4, in a third operating mode;

FIG. 8 illustrates a schematic representation of a second embodiment of the propulsion for one of the unmanned aircraft according to FIGS. 1 to 3;

FIG. 9 illustrates a schematic representation of the second embodiment of the propulsion according to FIG. 8, in a first operating mode;

FIG. 10 illustrates a schematic representation of the second embodiment of the propulsion according to FIG. 8, in a second operating mode;

FIG. 11 illustrates a schematic representation of the second embodiment of the propulsion according to FIG. 8, in a third operating mode;

FIG. 12 illustrates a schematic representation of a third embodiment of a propulsion for one of the unmanned aircraft according to FIGS. 1 to 3;

FIG. 13 illustrates a schematic representation of the third embodiment of the propulsion from FIG. 12, in a first operating mode;

FIG. 14 illustrates a schematic representation of the third embodiment of the propulsion from FIG. 12, in a second operating mode;

FIG. 15 illustrates a schematic representation of the third embodiment of the propulsion from FIG. 12, in a third operating mode;

FIG. 16 illustrates a schematic representation of the third embodiment of the propulsion from FIG. 12, in a fourth operating mode;

FIG. 17 illustrates a schematic representation of the third embodiment of the propulsion from FIG. 12, in a fifth operating mode.

DETAILED DESCRIPTION

Figure 1:
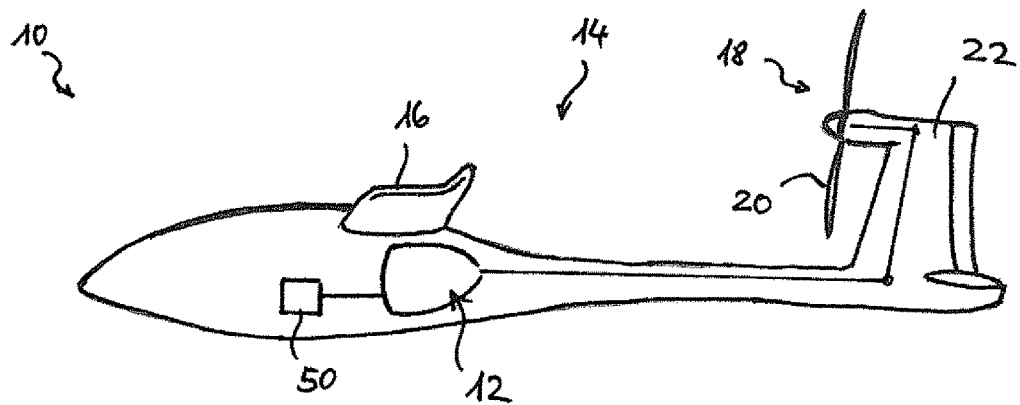
FIG. 1 illustrates a schematic representation of a first embodiment of an unmanned aircraft with propulsion.
Figure 2:
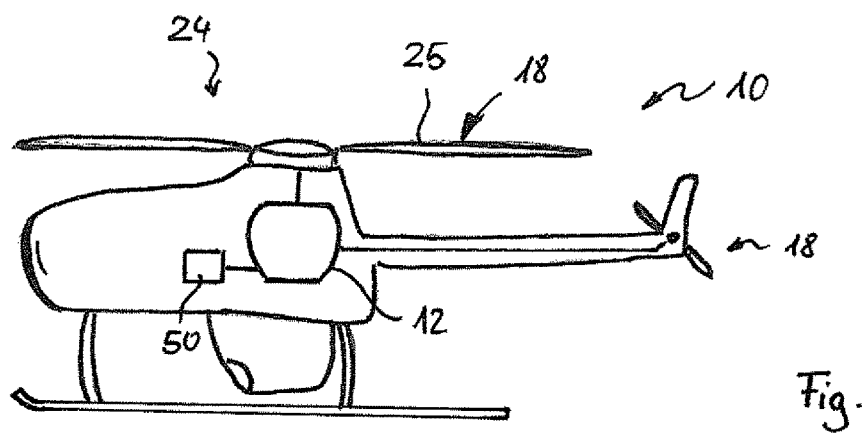
FIG. 2 illustrates a schematic representation of a second embodiment of an unmanned aircraft with propulsion.
Figure 3:
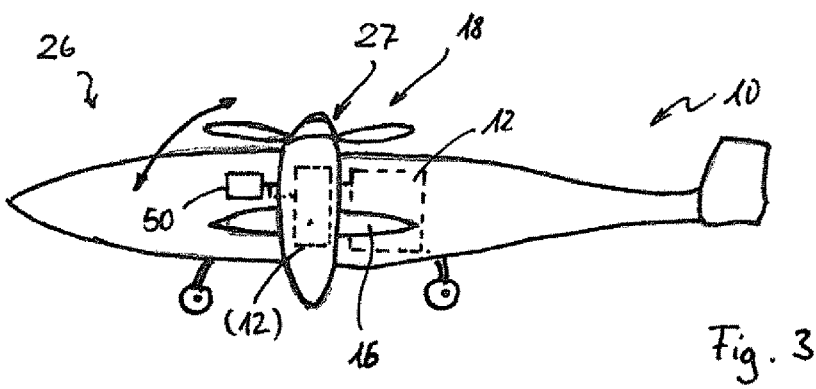
FIG. 3 illustrates a schematic representation of a third embodiment of an aircraft with propulsion.

Three different embodiments of unmanned aircraft 10 are represented schematically, with a relevant propulsion 12, in FIGS. 1 to 3. The unmanned aircraft 10 are also called drones or (in the technical terminology) UAVs. They are a part of a system for unmanned aviation—called a UAS—with which military and civilian operations, and in particular reconnaissance flights, surveillance functions, or measurement functions, can be performed. Other than the depicted unmanned aircraft 12, the UAS also has system components that are not shown here but are well known, such as, for example, the ground-based control station with which the UAV can be remotely operated, and corresponding communication devices for communication between the unmanned aircraft 10 and the control station. For further details on UASs, reference can be made to the previously made publication, Reg Austin's "Unmanned Aircraft Systems—UAS design, development and deployment" published by Wiley in 2010.

FIG. 1 depicts a first UAV 14 which is provided in the form of an engine-operated glider having fixed wings 16, an ordinary empennage 18, and a thrust generator, here in the form of a propeller 20, e.g., on the vertical stabilizer 22. The construction of this first UAV 14 is based on the construction of the glider "e-Genius", provided with an electric auxiliary propulsion, which was developed by the University of Stuttgart's Institute of Aircraft Design and completed its maiden flight on 25 May 2011.

Unlike the known e-Genius touring motor glider with electric propulsion, the first UAV 14 is, in contrast, not equipped with a passenger cockpit; rather, the space that had been developed for the pilot and a passenger is provided in order to house UAS components and the payload thereof for performing the desired UAV mission.

The second UAV 24 depicted in FIG. 2 is a helicopter version of a UAV, which can likewise be propelled with the propulsion 12. Here, a rotor 25 or a rotor 25 and a tail rotor is/are provided as the thrust generator 18.

The third UAV 26 depicted in FIG. 3 is another example of an unmanned aircraft 10, using the example of a tiltwing aircraft (a tiltwing and tiltrotor configuration). In this third UAV 26, the propulsion 12 is used to drive the thrust generator 18 in the form of tiltrotors 27.

Different embodiments for the propulsion 12 shall be made more apparent below with reference to FIGS. 4 to 17.

In all three of the different embodiments of the propulsion 12 depicted here, the propulsion is provided with an internal combustion engine 28 designed for diesel and/or kerosene operation and a charger device 30 for charging the internal combustion engine 28.

The propulsion 12 is furthermore a hybrid propulsion 32 in all three of the embodiments depicted here. The hybrid propulsion 32 comprises an electrical machine 23 in addition to the internal combustion engine 28. The electric machine 34 can be used as an electric motor 36 in one type of operation, which is indicated by the letter M in the drawings, and can be used as an electrical generator 38 in another type of operation, which is indicated by the letter G in the drawings. In additional embodiments not depicted in greater detail here, the electrical machine 34 may be either an electric motor or a generator. In further embodiments that shall be described in greater detail below, a separate electric motor 36,M and a separate generator 38,G are provided.

The hybrid propulsion 32 further comprises an electric energy storage device 40, which is designed, for example, as an arrangement of rechargeable battery cells or as an accumulator arrangement, and is identified also with a "B" in the drawings. The electrical machine 34 is connected to the electric energy storage device 40,B via power electronics 42.

In the illustrated embodiments, the hybrid propulsion 32 is configured as a parallel hybrid, it being optionally possible to use the internal combustion engine 28 or the electric motor 36 to propel the unmanned aircraft 10, or possible to use both the internal combustion engine 28 and the electric motor together to propel the unmanned aircraft. To this end, a shiftable coupling device 44 is provided, with which the internal combustion engine 28 and the electrical machine 34 can selectively be coupled to an output shaft 62 connected to the thrust generator 18.

The shiftable coupling device 44 comprises a first coupling 46 for coupling the internal combustion engine 28 and a second coupling 48 for coupling the electrical machine 34. The coupling device 44 and the charger device 30 can be controlled (see FIGS. 1 to 3) in accordance with a variety of parameters during flight operation, as shall be described in greater detail below. "Coupling" refers here to a general term for devices with which torque can be selectively transmitted (when the coupling is engaged) or shut down (when the coupling is disengaged).

As can be further seen in FIGS. 4 to 17, the charger device 30 comprises at least a first charger 52 for charging the internal combustion engine 28. The first charger 52 may be configured as an exhaust gas turbocharger 54 for making use of the exhaust gas energy for the purpose of charging.

In particular, the charger device 30 comprises a compressor 56 for generating pressure, in order to deliver combustion air at elevated pressure to the internal combustion engine 28.

The compressor 56 can be coupled to a first exhaust gas turbine 58, so as to form the exhaust gas turbocharger 54 as the first charger 52.

The internal combustion engine 28 comprises a rotary piston engine 60, in a preferred design. The rotary piston engine 60 is in particular configured in such a manner as is described and illustrated in German patent application DE 10 2012 101 032.3, and is accordingly designed for operation with diesel or kerosene. Depending on the desired power level for the UA 14, 24, 26, the rotary piston engine 60 is configured as a single-rotor rotary piston engine, a two-rotor rotary piston engine, a three-rotor rotary piston engine, or a multi-rotor rotary piston engine. The configuration of the rotary piston engine 60 comprises a special ability for modularity, for this purpose, so that one or a plurality of rotors can be provided at low cost.

Whereas the foregoing is a description the common elements of the embodiments of the propulsion 12 depicted here, the following addresses the differences between the embodiments depicted here in greater detail.

FIGS. 4 to 7 illustrate a first embodiment for the propulsion 12, with a single-stage charging, wherein only the first charger 52 is depicted, in the form of the exhaust gas turbocharger 54 with the compressor 56,C and the first exhaust gas turbine 58,T connected to the compressor 56. The internal combustion engine 28 and the electrical machine 34 can optionally be connected to the output shaft 62 and thus to the thrust generator 18 via the first coupling 46 and the second coupling 48.

The propulsion 12 thus includes the internal combustion engine 28, which may be configured as a diesel engine and as a Wankel engine and is provided with a charging system in the form of the charger device 30 having the compressor 56 and the first exhaust gas turbine 58. The engine output shaft 64 can be connected to the thrust generator 18 via the first coupling 46. The generator 38 and the electric motor 36 or—as depicted here—the electrical machine 34 able to operate as a generator G or as an electric motor M are connected via an electronic control unit—the power electronics 42,E—to a backup battery—the electric energy storage device 40,B—which is alternately charged during generator operation or is used to supply electrical energy to the electrical machine 34 in electric motor operation.

FIG. 5 illustrates a first operating mode in which the hybrid propulsion 32 is operated in pure electric operation. For this purpose, the first coupling 46 is disengaged and the second coupling 48 is engaged.

FIG. 6 illustrates the "conventional" operation, in which the propulsion power of the hybrid propulsion 32 is provided solely through the internal combustion engine 28. For this purpose, the first coupling 46 is engaged and the second coupling 48 is disengaged.

In the third operating mode, illustrated in FIG. 7, both the first coupling 46 and the second coupling 48 are engaged, and thus both the internal combustion engine 28 and the electrical machine 34 are connected to the output shaft 62 and therefore also to one another. In this third mode, it is possible to perform an electric booster function when the electrical machine is operating as the electric motor M—thus increasing the system performance through additional electric energy—or to perform a charging operation during the generator function G of the electrical machine 34.

Thus, through the illustrated configuration of the first embodiment of the hybrid propulsion 32, as depicted in FIGS. 4 to 7, at least the four following operating states are possible:

a) Conventional operation: The internal combustion engine 28 drives the thrust generator 18, while the generator G and the electric motor M are decoupled. This corresponds to the operating mode of existing UAV propulsion systems based on internal combustion engines.

b) "Electric boost": In addition to the internal combustion engine 28, the electric motor M is also coupled to the output shaft 62. This makes it possible to transmit an additional torque to the output shaft 62, thus making additional power available for a brief time—depending on the capacity of the electric energy storage device 40—and accordingly enabling compensation for peaks in the power demand.

c) "Charging mode": In operating phases which do not require the entire engine power of the internal combustion engine 28 for the thrust generator 18, a portion of the available power can be delivered to the generator G, in order to re-charge the electric energy storage device 40.

d) "Purely electric operation": In addition to the operating modes above, the internal combustion engine 28 can also be decoupled and turned off, in order to switch to a purely electric operation. Here, the electric motor E is then coupled to the output shaft, which is supplied with electric energy from the electric energy storage device B.

This offers, in particular, the following advantages:

The function of a parallel hybrid allows for purely electric operation to reduce the thermal and acoustic signature in critical mission phases. At the same time, in conventional operation the high energy storage density of fossil fuels can be exploited, in order to achieve ranges that are not available through pure electric propulsion. In addition, the system offers the possibility of charging batteries in flight, whereby an efficient operating state of the internal combustion engine 28 can be selected through a load point increase of the internal combustion engine 28.

FIGS. 8 to 11 illustrate a second embodiment of the hybrid propulsion 32. This second embodiment corresponds essentially to the first embodiment except for the difference that in addition to the first exhaust gas turbine 58, the second embodiment also comprises a second exhaust gas turbine 66,T, which is or can be coupled to the engine output shaft 64 and/or the output shaft 62.

The second exhaust gas turbine 66 makes it possible for the exhaust gas energy of the internal combustion engine 28 to be exploited in two stages. In the first exhaust gas turbine 58,T, the exhaust gas energy is used by the compressor 56,C for charging the internal combustion engine 28. In the second exhaust gas turbine 66, the remaining exhaust gas energy is used for further propulsion.

This makes it possible, in contrast to the first embodiment, to lower the exhaust gas temperature and thus reduce the thermal signature of the unmanned aircraft 10.

The functionality of the second embodiment of the hybrid propulsion as illustrated in FIGS. 8 to 11 otherwise corresponds to that of the first embodiment of the hybrid propulsion 32, as illustrated in FIGS. 4 to 7. Accordingly, FIG. 9 illustrates the first operating mode for the pure electric operation, FIG. 10 illustrates the second operating mode for the conventional operation, and FIG. 11 illustrates the third operating mode in which either the electric boost can be performed or the charging operation can be performed. For further details of these three operating modes, reference is made to the above implementations with respect to the first embodiment.

FIGS. 12 to 17 illustrate a third embodiment of the hybrid propulsion 32, as an example of the propulsion 12 for the UAVs 14, 24, 26, wherein identical or corresponding elements bear identical reference numerals as in the first two embodiments and reference can be made to the above statements for further details.

In this third embodiment, the charger device 30 is configured for switchable multi-stage charging and comprises the first charger 52 and a second charger 70 for providing the multi-stage charging, wherein the different chargers 52, 70 can be switched on or switched off under the control of the controller 50 in order to switch the different stages of charging on or off.

In the third embodiment of the hybrid propulsion 32, at least one electric motor 36,M and one generator 38,G are represented here in place of the electrical machine 34, which can operate in both the electric motor operation and the generator operation. The coupling device 44 comprises the first coupling 46 for coupling the engine output shaft 64 to the output shaft 62, the second coupling 48 for coupling the electric motor 36,M to the output shaft 62, and a third coupling 72 for coupling the generator 72 to the engine output shaft 64.

Furthermore, a charger coupling device 74 is provided, in order to switch the charger device 30, and in particular to couple or decouple the first charger 52 and/or the second charger 70.

The compressor 56 having the first exhaust gas turbine 58 is provided in order to form the first charger 52.

Next, a mechanical charger 76 is provided as the second charger 70. The mechanical charger 76 may use, for example, the compressor 56 and a mechanical propulsion source. For this purpose, a first design or first charging mode makes use of an electric propulsion and in particular the electric motor 36,M. A second implementation or second charging mode makes use of the movement of the engine output shaft 64 for this purpose.

In the embodiment illustrated in FIG. 12, schematically, the compressor 56,C is represented as a pressure generator that can be coupled to the first exhaust gas turbine 58 through a first charger coupling 78 of the charger coupling device 74 in order to form the exhaust gas turbocharger 54 as a first charger 52, and can be coupled to the electric motor 36,M through a second charger coupling 80 of the charger coupling device 74 in order to form the electrically operated mechanical charger 76 and, if necessary, can be coupled to the engine output shaft 64 through a third charger coupling 82 of the charger coupling device in order to form the mechanical charger 76 that can be driven by the movement of the output shaft.

In the implementation depicted, simply the second coupling 48 of the switchable coupling device 44 is indicated as the third charger coupling 82.

FIGS. 13 to 17 depict five different operating modes for this third embodiment of the hybrid propulsion 32. In the operating mode of FIG. 13, the first charger coupling 78 is engaged such that the first charging stage is active. The internal combustion engine 28, being charged with the first stage, is connected to the thrust generator 18 through the engaged first coupling 46. The generator 38,G is connected, as necessary, to the engine output shaft 64 through the engaged third coupling 72. Therefore, the first operating mode illustrated in FIG. 13 corresponds to charging operation, where thrust is produced via the internal combustion engine 28 being charged on the first stage, and excess power is used to charge the electric energy storage device 40. The second coupling 48 and the second charger coupling 80 are disengaged such that the electric motor 36 is connected neither to the charger device 30 nor to the thrust generator 18.

FIG. 14 illustrates the electric operation, as the second operating mode. For this purpose, the second charger coupling 80 is disengaged and the electric motor is connected through engagement of the second coupling 48 to the output shaft 62 and therefore the thrust generator 18. The first coupling 46 and the third coupling 72 are disengaged such that neither the internal combustion engine 28 nor the generator is connected to the output shaft 62. The internal combustion engine 28 can be switched off here.

The third operating mode illustrated in FIG. 15 corresponds to the conventional operation in single-stage charging, purely with the exhaust gas turbocharger 54. For this purpose solely the first coupling 56 and the first charger coupling 78 are engaged, and all other couplings are disengaged.

FIG. 16 illustrates a fourth operating mode in the form of an operation purely with the internal combustion engine 28, which is instead charged by the second charger 70 (electric charging). For this purpose, the first coupling 46 and the second charger coupling 80 are engaged and all other couplings are disengaged.

FIG. 17 illustrates a fifth operating mode in which the electric boost is presented as an additional functionality. For this purpose, the internal combustion engine 28 (the exhaust gas turbocharger 54 being active) having undergone single-stage charging is connected to the thrust generator 18; in addition, the electric motor 36 is still connected to the thrust generator 18, as well. The first coupling 46 and the second coupling 48 as well as the first charger coupling 78 are engaged, and all other couplings are disengaged.

It shall be readily understood that other operating modes are possible through various switches made with the various couplings 46, 48, 72, 78, 80, 82.

In the third embodiment of the hybrid propulsion 32 illustrated in FIGS. 12 to 17, the propulsion 12 has an internal combustion engine (a diesel engine/Wankel engine) having a charging system (charger device 30) comprising the compressor 56 and the exhaust gas turbine 58. The compressor 56 of the charger device 30 can, in this case, be propelled via a coupling system (charger coupling device 74) either by the exhaust gas turbine 58 or an electric motor, e.g., the electric motor M of the hybrid system. The engine output shaft 64 of the internal combustion engine 28 can be directly connected to the thrust generator 18 (e.g., a propeller 20 or rotor 25, 27). In addition, the electrical generator 38,G is to be connected to the engine output shaft 64 and/or the output shaft 62 via a separate coupling (third coupling 72). The generator 38,G and the electric motor 36,M are connected via an electronic control unit (power electronics 42,E) to a backup battery (an example of the electric energy storage device 40,B) which alternately is charged by the generator 38,G or is to be used for supply to the electric motor 36,M.

The construction illustrated in FIGS. 12 to 17 enables, in particular, the following four operating states:

a) "Conventional operation": The compressor 56 of the exhaust gas turbocharger 54 is propelled by the exhaust gas turbine 58 of the charger device 30, while the electric motor 36,M and generator 38,G are decoupled. This corresponds to the operating mode of existing conventional propulsion systems, but with the difference of diesel or kerosene operation with additional charging.

b) "Electric turbo": The compressor 56 of the charger device 70 is in this case propelled by the electric motor 36,M. This allows a greater increase in power to be generated than would take place in coupling of the electric motor 36,M to the output shaft 62.

c) "Electric boost": Here, in addition to the power of the internal combustion machine, the power of the electric motor 36,M is also transmitted to the output shaft 62.

d) "Charging mode": In operation phases where not all of the engine power of the internal combustion engine 28 is required by the thrust generator 18, then a portion of the available power can be delivered to the generator 38,G, in order to re-charge the battery (electric energy storage device 40,B). The compressor 56 of the charger device 30 is in this case driven by the exhaust gas turbine 58 while the electric motor 36,M is decoupled.

This offers, in particular, the following advantages.

In addition to the functionality of a parallel hybrid (operation with an internal combustion machine, purely electric operation, or recharging of the battery), the electric motor 36,M can be used in two ways in order to make additional power available:

a) through an electric boost in which the power is directly fed to the output shaft 62, or b) through an electrically driven mechanical charger 76, with which the required power for charging is provided by the electric motor 36,M and need not interfere with the process of the internal combustion engine. This is advantageous in that, in contrast to propulsion with an exhaust gas turbine 58, no back pressure is built up in the exhaust gas, against which the internal combustion engine 28 would otherwise need to work. In contrast to the use of a mechanical propulsion for the mechanical charger 76—in particular, through coupling to the engine output shaft 64—there is no need to detract any mechanical power of the output shaft.

Different embodiments of the hybrid propulsion 32 are presented above, with reference to the drawings. It shall be readily understood that further embodiments are also possible, but these are not shown here. For example, the second exhaust gas turbine 66 may also be present in the embodiment illustrated in FIGS. 12 to 17, and in particular may be switchable via a separate switching device that can switch this second exhaust gas turbine 66 on or off.

Furthermore, either in addition to or alternatively to the propulsion of the mechanical charger 76 through the electric motor 36 of the hybrid propulsion, it would also be possible to have a separate electric motor for the propulsion of the compressor. On the other hand, it would also be possible to drive the compressor 56 via the engine output shaft 64. Moreover, instead of the depiction with only one compressor 56, it would also be possible to provide a plurality of compressors, which can be driven via the first exhaust gas turbine 58, the second exhaust gas turbine 66, the electric motor 36 of the hybrid propulsion 32, and/or through the engine output shaft 64.

A possible control of the hybrid propulsion 32 for the unmanned aircraft 10 shall be described in further detail below, with reference to the illustration in FIG. 18.

As illustrated in FIGS. 2 and 3, the unmanned aircraft 10 may be a UAV 24, 26, which is capable of vertical takeoff and landing (VTOL), and/or a UAV 14, 26, which is capable of a convention takeoff and landing as with an airplane (making use of the flow of air during travel of the aircraft 10 (CTOL)).

Figure 18:
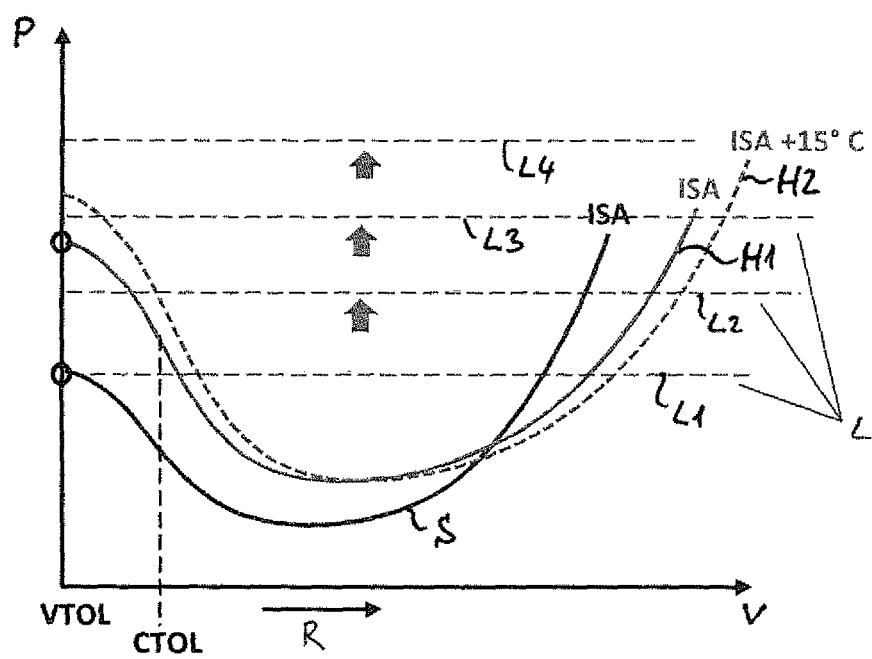
FIG. 18 illustrates a schematic diagram for representing a control of the propulsion of the unmanned aircraft on the basis of different parameters in flight operation.

The diagram in FIG. 18 illustrates the required power P over the flight velocity v. The arrow R indicates the range of cruising flight—the cruising range. "ISA" stands for the international standard atmosphere.

The curve S shows the power needed for various flight conditions at sea level and at standard atmospheric conditions; the curve H1 shows the power needed at high altitudes and standard atmospheric conditions, and the curve H2 shows the power needed at higher altitudes and at standard atmospheric conditions elevated by approximately 15° C.

The various operating modes provide coverage for all of the power ranges that are required with these various operating conditions and flight conditions.

The controller switches through the various operating modes, in particular the switching on or off of the charger device or the switching on or off of various chargers or various stages of charging, in accordance with parameters that are indicative of these operating conditions, such as the target/actual velocity, altitude (in particular, as can be detected via pressure sensors), desired VTOL or CTOL, or temperature.

The power stages L represented in the drawings, which can be switched on or off by the control, denote the maximum available power for:

L1 internal combustion engine operation without charging;

L2 internal combustion engine operation with charging in a first stage—in particular, operation of the first charger 52, i.e., of the exhaust gas turbocharger 54;

L3 internal combustion engine operation with charging in the second stage—for example, operation of the second charger 70, such as in particular of the electrically drive mechanical charger 76;

L4 internal combustion engine operation with charging in the second stage and additionally with the electric boost function.

The engine charging increases the available engine power of the internal combustion engine 28. This allows in particular for vertical takeoffs at higher altitudes and/or at higher ambient temperatures ("hot and high conditions"). This further increases the maximum cruising velocity.

The possibility of the electric boost further increases the available power for such conditions, where the limit of the power increase is reached through engine charging. This makes it possible to further extend the application areas. For example, vertical takeoffs at even higher altitudes and at even higher temperatures are possible; a maximal cruising velocity in difficult conditions can also be further increased.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS LIST

10: unmanned aircraft;
12: propulsion;
14: first UAV;
16: wing;
18: thrust generator;
20: propeller;
22: vertical stabilizer;
24: second UAV;
25: rotor;
26: third UAV;
27: tiltrotor;
28: internal combustion engine;
30: charger device;
32: hybrid propulsion;
34: electrical machine;
36,M: electric motor;
38,G: generator;
40,B: electric energy storage device;
42,E: power electronics;
44: switchable coupling device;
46: first coupling;
48: second coupling;
50: controller;
52: first charger;
54: exhaust gas turbocharger;
56: compressor;
58: first exhaust gas turbine;
60: rotary piston engine;
62: output shaft;
64: engine output shaft;
66: second exhaust gas turbine;
70: second charger;
72: third coupling;
74: charger coupling device;
76: mechanical charger;
78: first charger coupling;
80: second charger coupling;
82: third charger coupling;
S: sea level;
R: cruising range;
v: forward speed;
P: power;
H1: high altitude, at ISA;
H2: high altitude, at ISA+15° C.;
ISA: standard atmosphere;
VTOL: vertical takeoff/landing;
CTOL: conventional takeoff/landing;
L1: internal combustion engine operation without charging;
L2: internal combustion engine operation with charging, first stage;
L3: internal combustion engine operation with charging, second stage;
L4: internal combustion engine operation with charging, second stage+electric boost

The invention claimed is:

1. An unmanned aircraft, comprising:
a propulsion system that comprises a diesel or kerosene internal combustion engine, wherein the propulsion system is a hybrid propulsion system which, in addition to the internal combustion engine, comprises an electric motor and an energy storage device configured to store electric energy for driving the electric motor;
a charging device configured to charge the internal combustion engine of the unmanned aircraft; and
a controller configured to control the charging device or the hybrid propulsion in accordance with flight operation parameters,
wherein the charging device is designed for multi-stage charging,
wherein the charging device comprises multiple exhaust gas turbines that are connected in series,
wherein the charging device additionally comprises at least one mechanical charger configured to be driveable by the electric motor of the hybrid propulsion, and
wherein the controller is configured to control charging of the charging device with or without the use of exhaust gas energy and by the use of mechanical energy from the internal combustion engine or from the electric motor.

2. The unmanned aircraft of claim 1, wherein the hybrid propulsion system comprises a switchable coupling device with which the internal combustion engine or the electric motor is selectively connected to a thrust generator.

3. The unmanned aircraft of claim 1, wherein the internal combustion engine and the electric motor are configured to be selectively operated in parallel or in series.

4. The unmanned aircraft of claim 1, wherein the charging device comprises at least one charger that is configured to be driven by exhaust gas energy.

5. The unmanned aircraft of claim 1, wherein the at least one mechanical charger is driven by an output shaft of the internal combustion engine or through an electric motor.

6. The unmanned aircraft of claim 1, wherein the controller is configured to control switching on and off of a first or second stage of the engine charging or the switching on and off of the electric motor, in accordance with at least one of the parameters of altitude, angle of a takeoff or landing flight to the vertical, desired velocity, allowable heat output, allowable operating noise level, or temperature.

7. The unmanned aircraft of claim 1, wherein the internal combustion engine is a rotary piston engine.

8. The unmanned aircraft of claim 1, wherein the aircraft has a maximum takeoff weight of more than 250 kg.

* * * * *